(12) United States Patent
Mueller et al.

(10) Patent No.: US 10,957,108 B2
(45) Date of Patent: Mar. 23, 2021

(54) AUGMENTED REALITY IMAGE RETRIEVAL SYSTEMS AND METHODS

(71) Applicant: Shutterstock, Inc., New York, NY (US)

(72) Inventors: Derek Mueller, New York, NY (US); Matthew Ferri, Brooklyn, NY (US)

(73) Assignee: Shutterstock, Inc., New York, NY (US)

( * ) Notice: Subject to any disclaimer, the term of this patent is extended or adjusted under 35 U.S.C. 154(b) by 3 days.

(21) Appl. No.: 16/384,338

(22) Filed: Apr. 15, 2019

(65) Prior Publication Data

US 2020/0327733 A1    Oct. 15, 2020

(51) Int. Cl.
*G06T 19/00* (2011.01)
*G06F 16/432* (2019.01)
(Continued)

(52) U.S. Cl.
CPC ............ *G06T 19/006* (2013.01); *G06F 3/017* (2013.01); *G06F 16/434* (2019.01);
(Continued)

(58) Field of Classification Search
CPC ... G06T 19/006; G06F 16/434; G06F 16/483; G06K 9/00671; G06N 20/00
See application file for complete search history.

(56) References Cited

U.S. PATENT DOCUMENTS

2007/0288432 A1\* 12/2007 Weltman ................ G06F 16/583
2013/0328760 A1\* 12/2013 Honea .................. G06F 3/04842
                                                          345/156

(Continued)

FOREIGN PATENT DOCUMENTS

KR    10-2018-0040865 A    4/2018
WO    2015-192117 A1    12/2015
WO    2019-055352 A1    3/2019

OTHER PUBLICATIONS

Samuel Axon, "How ARKit 2 works, and why Apple is so focused on AR" Ars Technica [online], Jun. 16, 2018 [retrieved on Nov. 11, 2019]. Retrieved from the Internet: <URL: https://arstechnica.com/gadgets/2018/06/arkit-2-why-apple-keeps-pushing-ar-and-how-it-works-in-ios-12/>.

(Continued)

*Primary Examiner* — Michelle L Sams
(74) *Attorney, Agent, or Firm* — McDermott Will & Emery LLP

(57) ABSTRACT

Various aspects of the subject technology relate to augmented reality image retrieval. An application running on a user device allows the user to visualize and modify design features for a real-world object, such as a billboard, a bus-mounted advertisement, or a wall of a room in a building. The application is communicatively coupled to an image server having an image database with millions of available images, and having intelligent processing to identify recommended images from the database, based on the design aspects from the user. The application provides a selectable option to view the design aspects, and/or the recommended database images, on a captured image of the real-world object. In this way, the user is provided with the ability to design the appearance of the real-world object by visualizing and/or modifying, in real time, server-recommended images as they will appear on the real-world object.

19 Claims, 15 Drawing Sheets

(51) Int. Cl.
*G06N 20/00* (2019.01)
*G06K 9/00* (2006.01)
*G06F 3/01* (2006.01)
*G06F 16/483* (2019.01)

(52) U.S. Cl.
CPC ......... *G06K 9/00671* (2013.01); *G06N 20/00* (2019.01); *G06F 16/483* (2019.01)

(56) References Cited

U.S. PATENT DOCUMENTS

| | | | |
|---|---|---|---|
| 2016/0055676 A1* | 2/2016 | Kasahara | G06T 19/006 345/633 |
| 2016/0189426 A1 | 6/2016 | Thomas et al. | |
| 2016/0364793 A1 | 12/2016 | Sacco | |
| 2019/0197133 A1* | 6/2019 | Biswas | G06F 16/583 |
| 2019/0197599 A1* | 6/2019 | Zia | G06T 19/006 |
| 2019/0318540 A1* | 10/2019 | Piemonte | H04W 4/02 |
| 2019/0378204 A1* | 12/2019 | Ayush | G06Q 99/00 |
| 2020/0142994 A1* | 5/2020 | Jin | G06N 3/08 |

OTHER PUBLICATIONS

International Search Report and Written Opinion dated Jul. 24, 2020 in International Application No. PCT/US2020/028103.

* cited by examiner

AUGMENTED REALITY IMAGE RETRIEVAL SYSTEMS AND METHODS

BACKGROUND

Field

The present disclosure generally relates to computer-operated image retrieval systems, and more particularly to augmented reality image retrieval systems and methods.

Description of the Related Art

Digital design applications allow designers to generate and visualize virtual advertisements that are later deployed in the real world. These digital design applications can be helpful for designing billboards or bus-mounted advertisements. However, the virtual design environment provided by these digital design applications can often result in designs that are incompatible with, or otherwise undesirable in the real-world environment in which the design is ultimately deployed.

SUMMARY

The present disclosure provides a system for augmented reality visualization of designs for the appearance of real-world objects. For example, in many scenarios, a designer of a real-world object such as a billboard, a bus-mounted advertisement, a store-window advertisement, or a wall in an office or a home, may desire to print or otherwise display (e.g., electronically) a stock image from an image database on the real-world object. In various examples, a billboard for a mobile phone can include a stock image of a smiling female user talking on the phone in a park on a summer day, or a wall in an office building can be decorated with a photograph of a soaring eagle against a blue sky.

However, modern image servers can provide access to millions or billions of stock images that can enhance or optimize the effectiveness of the billboard or the aesthetic of the wall art. These modern image servers can allow efficient searching of vast image databases for images containing desired content, colors, themes, and/or other characteristics. However, it can be difficult to simultaneously sort through the many different image options, while visualizing the real-world outcome of a particular image selection, for a particular real-world object, in a particular real-world environment.

For example, a billboard with a stock image of a smiling female user talking on the phone in a park, can have an expectedly undesirable appearance if the female user is wearing a red shirt and the billboard is positioned in front of a red building. A modern image server can easily remedy this undesirable appearance by suggesting or otherwise providing a similar image with the female user wearing a blue shirt. However, this powerful feature of the modern image server can be left unused without the systems and methods disclosed herein that allow augmented reality visualization of many stock image options as they would appear on the real-world billboard.

In another example, an office designer choosing a stock image from the image server to decorate a wall of an office lobby can fail to appreciate the effect of newly planted foliage near the desired location of the stock image on the wall, when choosing from the image database. If physical mockups of a few selected image choices have been made without noting the new foliage, time, energy, and finances can be wasted. In contrast, the systems and method disclosed herein allow designs with many different image choices to be viewed, in situ, before an image file is ever sent for print or finalization.

Accordingly, the systems and methods disclosed herein provide an improvement to existing image servers and image selection and retrieval systems.

In some scenarios, images for the augmented reality display may be selected from a subset of database images, the subset recommended by a machine-learning engine of the image server, based on one or more desired characteristics for the image as provided by the user or designer.

In some scenarios, the systems and methods disclosed herein can automatically detect features of the real-world environment from an augmented reality sensor feed at the user device, and generate a suggested subset of images from the image database based on the detected features.

According to some aspects of the present disclosure, a computer-implemented method is provided. The method includes receiving, with an electronic device, image information associated with a real-world object; capturing, with the electronic device, at least one image of the real-world object; displaying, with the electronic device, the at least one image of the real-world object with an overlay associated with the image information; providing the image information from the electronic device to a machine-learning engine of an image server that is communicatively coupled to an image database; and receiving, at the electronic device from the image server, at least one recommended image, the at least one recommended image identified by the machine-learning engine based on the provided image information.

According to some aspects of the present disclosure, a computer-implemented method is provided. The method includes providing, for display by an electronic device, a virtual canvas, the virtual canvas comprising a virtual representation of a real-world object; receiving, with the electronic device, image information associated with a design for the real-world object; providing, for display by the electronic device, an overlay associated with the image information on the virtual representation of the real-world object; and providing, for display in association with the virtual canvas, a selectable option to view the overlay on an image of the real-world object.

According to some aspects of the present disclosure, a computer-implemented method is provided. The method includes receiving, at an image server having a machine-learning engine, image information associated with a design for a real-world object; receiving, at the image server, location information defining a location on the real-world object of a portion of the design; receiving, at the image server, a real-time image of the real-world object; providing, with the image server to the machine-learning engine, the image information, the location, information, and the image to the machine-learning engine; and identifying, with the machine-learning engine based on the image information, the location, information, and the image, one or more recommended images from an image database for placement on the real-world object.

According to some aspects of the present disclosure, a computer-implemented method is provided. The method includes providing, in an image query from a portable computer to an image server communicatively coupled to a database storing images and image metadata corresponding to the images, one or more image characteristics. The portable computer comprises an augmented reality sensor including at least one camera and at least one distance sensor. The method also includes receiving, with the portable computer from the image server, an image corresponding to the image characteristics; displaying the received image with a display screen of the portable computer; and displaying a selectable option to view the displayed image in the environment of the portable computer using the augmented reality sensor.

According to some aspects of the present disclosure, a computer-implemented method is provided. The method includes providing, in an image query, from a portable computer to an image server that is communicatively coupled to a database storing images and image metadata corresponding to the images, one or more image characteristics. The portable computer includes an augmented reality sensor including at least one camera and at least one distance sensor. The method further includes receiving, with the portable computer from the image server, an image corresponding to the image characteristics; displaying the received image with a display screen of the portable computer; and displaying a selectable option to view the displayed image in an environment of the portable computer using the augmented reality sensor It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Designers of the physical appearance of physical, real-world objects such as billboards, other print ads, wall art, or any other physical surface may choose one or more images to include on the physical object. Images are often included for aesthetics or to drive a desired consumer behavior by the designer. Augmented reality image retrieval systems and methods are disclosed herein, in which a live view can be created on a user device such as a portable computer (e.g., a smart phone or a tablet) that shows what various asset choices would look like if deployed in the real world. In various implementations, a user operating a design editor or an image query tool can be provided with an option to activate an augmented reality mode.

When activated, an augmented reality sensor in the user's device or another device can be operated to capture a real-time image of a real-world object and to obtain one or more physical characteristics of the real-world object such as the size, distance, position, and/or shape of the object. Using these physical characteristics, the design editor or the image query tool can overlay a selected image, a recommended image, and/or other user design content on the captured real-time image of the real-world object.

For example, a user of an image query tool running on the user's smartphone can click a button called "View in Room", resulting in a switch to an augmented reality mode of the image query tool. By, for example, holding the camera up to a wall, the augmented reality mode image query tool can be caused to identify a wall space on the wall and populate a selected or recommended image directly onto a real-time camera view of the wall. The user can then adjust the size, position, or other characteristics of the augmented reality overlay image, to get a better idea of what the image would look like if selected, printed, and hung or otherwise positioned on the wall. In this way, an expansive collection of images can be efficiently searched for use in a particular real-world location and environment.

Although the systems and methods disclosed herein are often described in the context of providing an augmented reality view of various selected images in the real world, the systems and methods can also be effectively applied in a virtual-world environment, such as for visualizing advertisements or other stock images or videos in 3D spaces in video games or other simulated environments.

Example System Architecture

Figure 1:
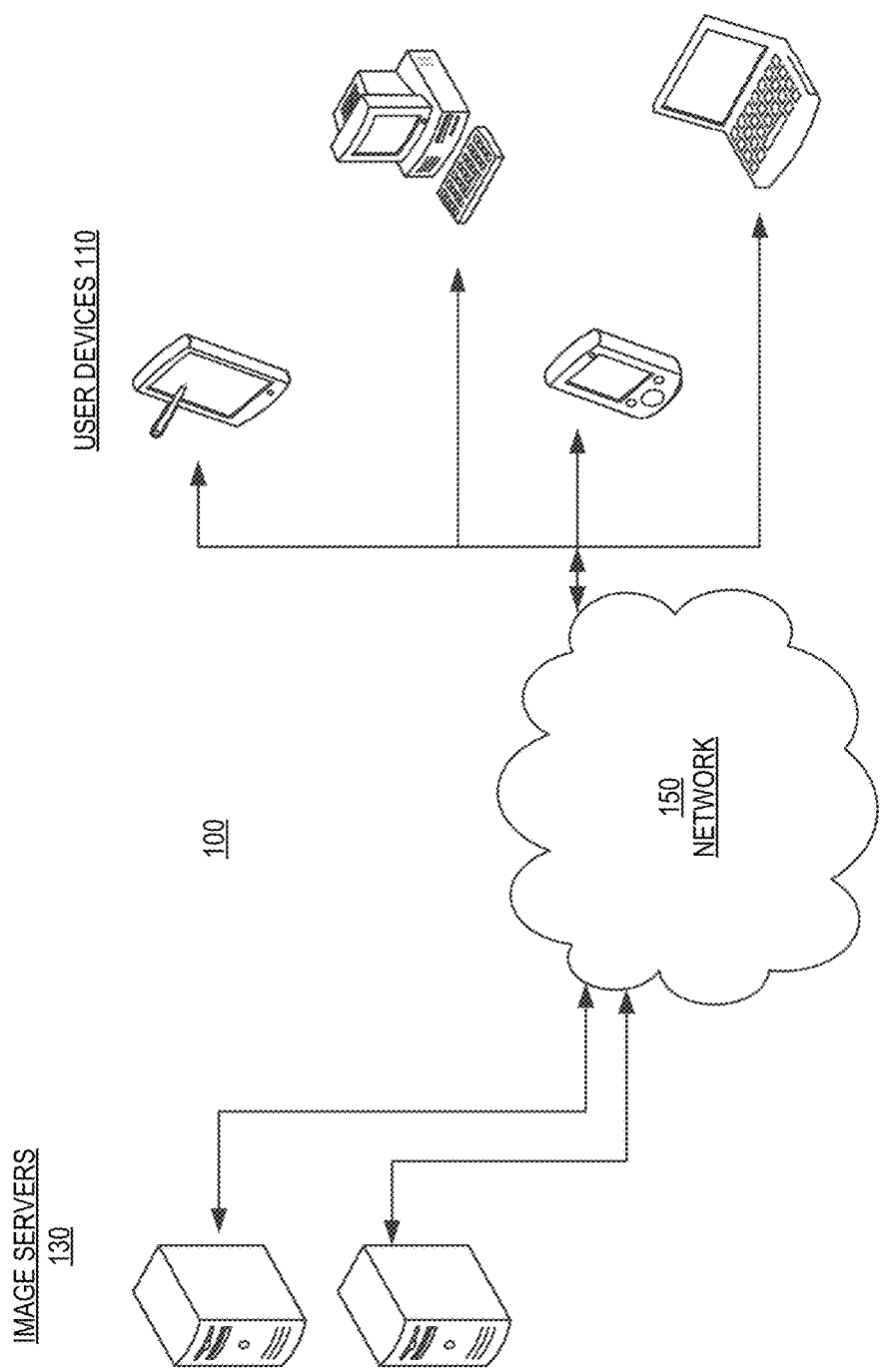
FIG. 1 illustrates an example architecture for augmented reality image retrieval, suitable for practicing some implementations of the disclosure.

FIG. 1 illustrates an example architecture 100 for augmented reality image retrieval, suitable for practicing some implementations of the disclosure. The architecture 100 includes image servers 130 and user devices 110 connected over a network 150.

One or more of image servers 130 is configured to host a machine-learning engine such as a machine-learning engine implementing a computer-operated neural network. The neural network may be trained to identify images corresponding to one or more inputs including image information that indicates desired content, a desired location or position of the desired content, a theme for the content (e.g., a season, a time of day, a color palette, a gender, a species of animal, an urban or rural theme, etc.), and/or one or more features or characteristics of a real-world (or virtual) environment in which the image is to be deployed.

One or more of image servers 130 also hosts a collection of images in an image database. The collection of images is accessible by an image distribution server to distribute images (e.g., to user devices 110) selected by the machine-learning engine (e.g., responsive to a receiving image information and/or real-world environment information for a desired image). Images from the collection, and feedback information from images that have been recommended or selected, can also be used to train the machine-learning engine to identify images likely to include the desired content, at the desired location and position, in the desired theme for a generic user or a particular user. For purposes of load balancing, multiple image servers 130 can host the neural network and multiple image servers 130 can host the collection of images.

Image servers 130 can each be implemented with any device having an appropriate processor, memory, and communications capability for hosting the machine-learning engine, the collection of images, and the distribution server. User devices 110 can be, for example, desktop computers, portable computers (e.g., tablet computers, e-book readers, smartphones, or personal digital assistances), or any other devices having appropriate processor, memory, and communications capabilities for accessing digital media provided by image servers 130, for receiving image information inputs from a user, and/or capturing images and/or physical characteristics of real-world objects. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Context-Based Image Selection

Figure 2:
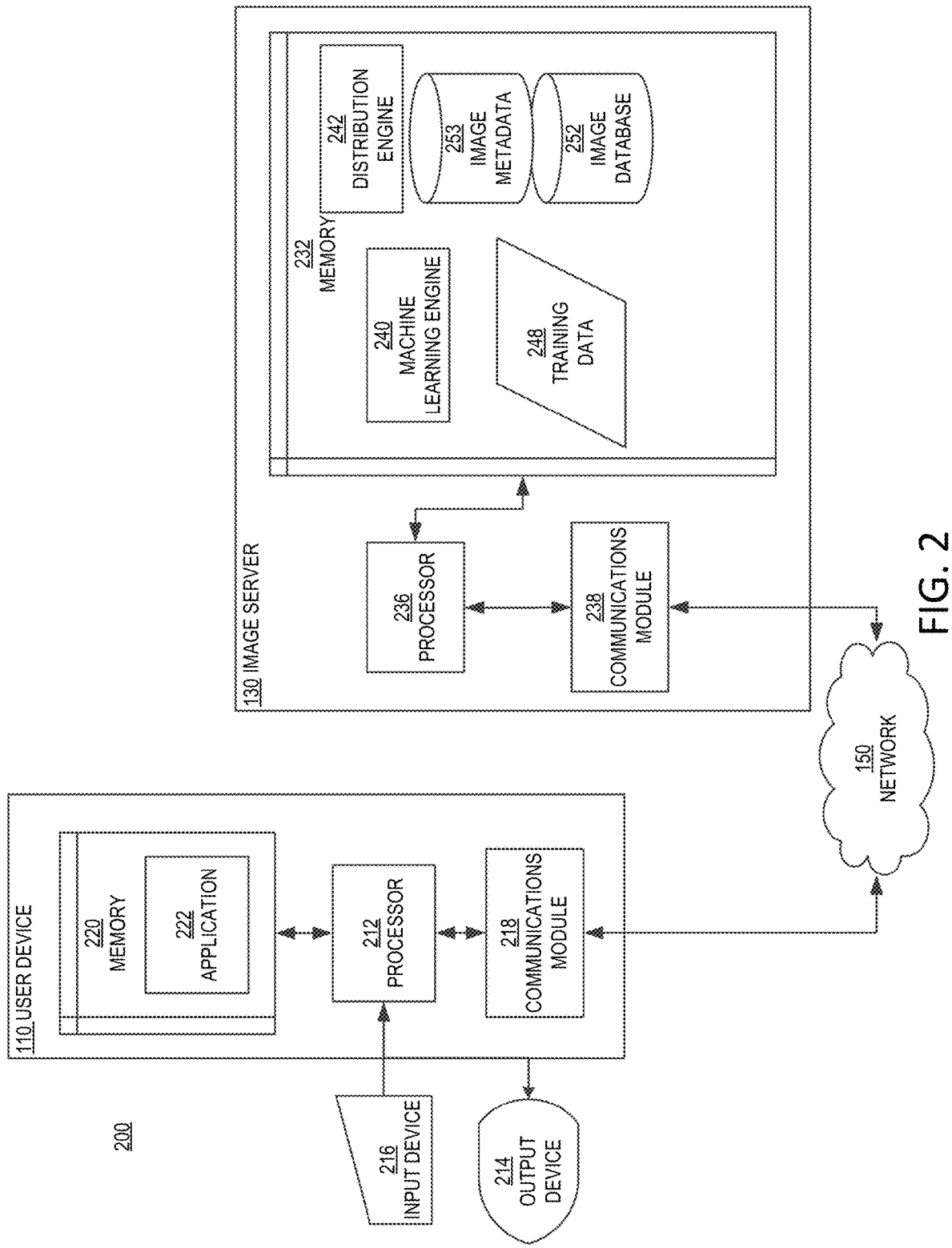
FIG. 2 is a block diagram illustrating an example user device, and image server from the architecture of FIG. 1, according to certain aspects of the disclosure.

FIG. 2 is a block diagram 200 illustrating an example image server 130 and user device 110 in the architecture 100 of FIG. 1, according to certain aspects of the disclosure. The user device 110 and the image server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The image server 130 includes a memory 232, a processor 236, and a communications module 238. The memory 232 of the image server 130 includes a machine-learning engine 240 and a distribution engine 242. In one or more implementations, machine-learning engine 240 may include a machine-learning model that implements a neural network. For example, the machine-learning model may utilize a deep neural network architecture or other deep-learning architecture. The machine-learning engine 240 may be provided with input data received at image server 130 from an application 222 (e.g., an augmented reality design editor or an augmented reality image query tool) running on user device 110, and/or with access to image metadata 253 and image database 252. The machine-learning engine 240 may be trained to identify, based on the provided input data, a recommended image from image database 252 that includes desired content at a desired position and location for a particular real-world (or virtual) environment as indicated by the input data received from user device 110. Once an image from image database 252 is identified by machine-learning engine 240, the image may be provided to user device 110 by distribution engine 242.

It should be appreciated that, although images, image servers, image databases, and image metadata are described herein in various examples, these examples are merely illustrative. The systems and methods described herein can be applied to media other than still images. For example, image database 252 can store digital photographs, videos, computer-generated images and/or videos, audio files, and/or other digital media that can be accessed by image server 130, categorized and identified by machine-learning engine 240, distributed by distribution engine 242, and/or provided to user device 110 for presentation to the user.

In order to train machine-learning engine 240, training data such as images from image database 252 (e.g., output training data), and sample image query inputs, content location inputs, and/or surrounding environment inputs intended to cause recommendation of the images (e.g., as input training data) may be provided to, for example, a neural network architecture or other machine-learning architecture for training the neural network to produce a machine-learning model for machine-learning engine 240 (e.g., by tuning parameters such as weights between neurons of the network, biases, thresholds, and/or other aspects of the model). In this way, the machine-learning engine may be trained so that future inputs of image information, location information, and/or surrounding object characteristic information cause the machine-learning engine to identify images that satisfy the queries of generic or individual users.

The memory 232 also includes a collection of images in an image database 252. In one or more implementations, the image database 252 represents a database that contains, for each image, a mapping from an image identifier to a data file containing pixel data for the image (e.g., in jpeg format). The images may be paired with image metadata 253 such as image vector information and image cluster information. In one or more implementations, the image vector information identifies vectors representing a large sample of images (e.g., about 250 million) and the image cluster information identifies the vectors in one or more clusters such that each of the cluster of images represents a semantic concept. In one or more implementations, the image database 252 includes a pixel dataset for each image, where the pixel dataset indicates an array of pixel values for each color channel (e.g., red, blue, green) of the image. The array of pixel values may include an integer value in a range of 0 to 255 for each pixel, where the value indicates the desired luminance of a corresponding pixel location.

Also included in the memory 232 of the image server 130 is a set of training data 248. The training data 248 can be, for example, a dataset of images with known compatibility with various real-world environment characteristics (e.g., the size, position, shape, color, or distribution of surrounding objects of a real-world object on which the images are to be deployed). Although the set of training data 248 is illustrated as being separate from the image database 252, in certain aspects, the set of training data 248 includes a subset of the collection of images in image database 252. Furthermore, although the image database 252 and the distribution engine 242 are illustrated as being in the same memory 232 of an image server 130 as the machine-learning engine 240, in certain aspects, the image database 252 and the distribution engine 242 can be hosted in a memory of a different server but accessible by the image server 130 illustrated in FIG. 2.

Deploying an image from image database 252 on a real-world object may include printing the image directly onto the real-world object, printing the image on physical medium (e.g., paper, polymer, metal, or wood sheets or sheets of other rigid or flexible materials) and attaching the physical medium to the real-world object, generating the image electronically with colored display pixels mounted on the real-world object (e.g., in the form of a digital billboard), projecting the image onto the real-world object, or otherwise causing the image to be visually present on at least a portion of the real-world object.

The processor 236 of the image server 130 is configured to execute instructions, such as instructions physically coded into the processor 236, instructions received from software in memory 232, or a combination of both. For example, the processor 236 of the image server 130 executes instructions to receive, from a user device, image information (e.g., along with location information and/or real-world environment information) associated with a design for a real-world object; to identify, with a machine-learning engine and based on the image information, a recommended image from a plurality of images stored in an image database, and to provide the recommended image to the user device.

User device 110 may include memory 220 storing an application 222 (e.g., code for a design editor application, an image query tool application, a camera application, an AR application, and/or other applications) that, when executed by one or more processors such as processor 212, cause the processor to perform one or more operations as described herein.

Input device 216 of user device 110 may be used to input or modify image information for the design of the real-world object. For example, input device 216 may include a keyboard, virtual keyboard, audio input device or other device in which a user can enter query terms for desired content, locations and positions for the content, and themes for a desired image. The input device 216 may include a touchscreen, mouse, or other input device that allows the user to manipulate, move, rotate, resize, recolor, or otherwise modify design information for the real-world object.

Input device 216 may also include an augmented reality sensor that includes one or more cameras for capturing images of the real-world environment and objects, and/or one or more distance sensors for determining the size, distance, position, shape, orientation, and/or other physical characteristics of one or more real-world objects. As examples, an augmented reality sensor can be implemented as an additional camera (e.g., a physically offset stereo camera for obtaining parallax information that can be used to determine distances), or as an infrared camera combined with an infrared light source that emits several (e.g., tens, hundreds, or thousands) of infrared beams that generate infrared spots at various measurement locations on real-world objects in the environment, reflected portions of which can be imaged by the infrared camera. In an infrared camera/source sensor, distortions of the infrared spots in a captured infrared image can be used, along with the known sizes and shapes of the infrared beams, to determine the absolute distance to each of the infrared spots. Accordingly, the absolute size, location, position, orientation, shape, and/or other characteristics of real-world objects can be determined by user device 110 and/or by image server 130 (e.g., by providing the augmented reality data and/or the captured images from user device 110 to image server 130). Input device 216 can be implemented as an integral component of user device 110 or may be a separate device that is communicatively coupled to, and operable by, user device 110.

Output device 214 may, for example, include a display screen such as a liquid crystal display screen, a light-emitting diode display screen, or any other suitable display screen.

Figure 3:
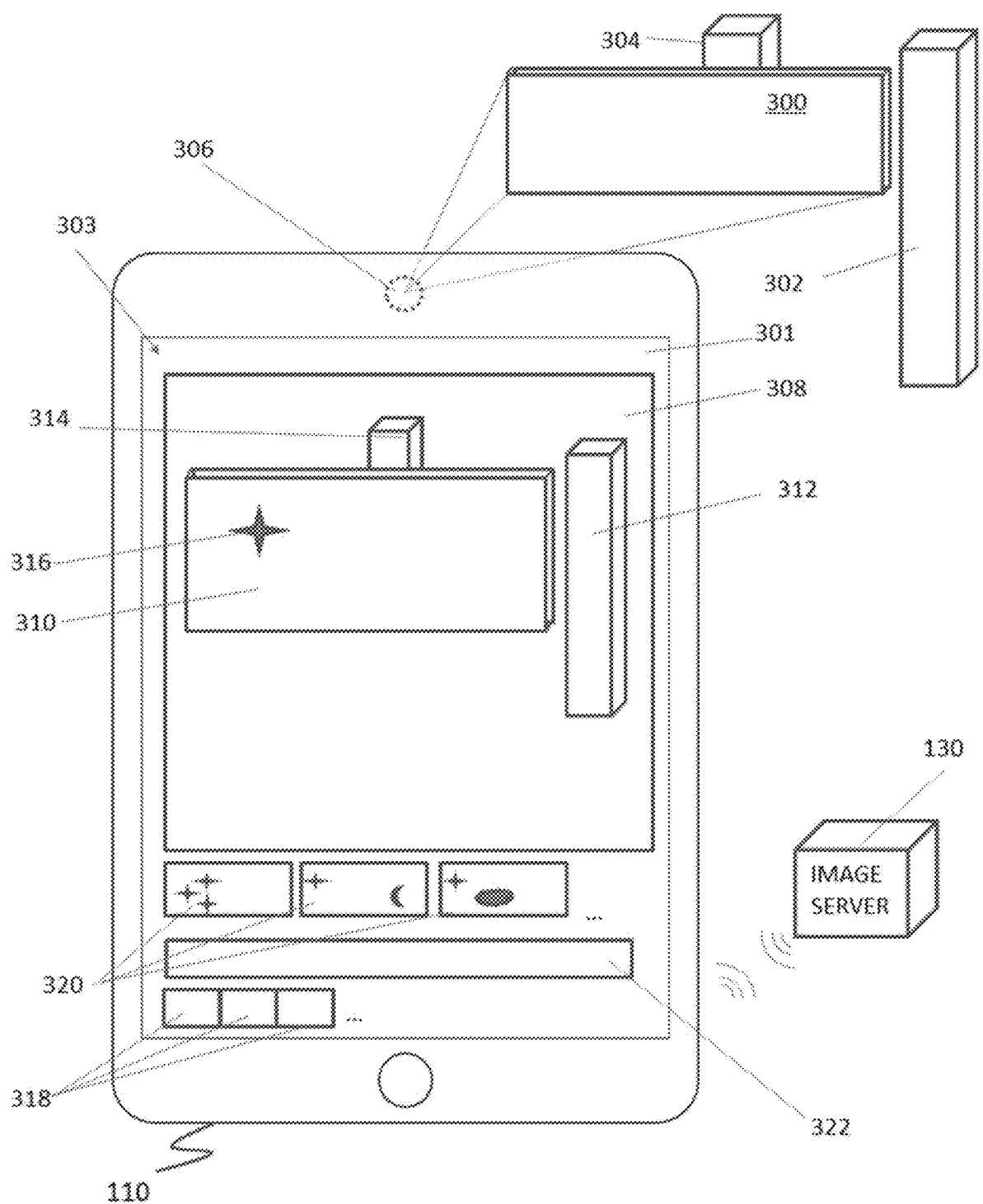
FIG. 3 illustrates an example user device operating a design editor with augmented reality image retrieval capabilities, according to certain aspects of the disclosure.

FIG. 3 illustrates an example of a user device 110 operating a design editor that includes augmented reality image retrieval capabilities, in accordance with aspects of the subject disclosure. In the example of FIG. 3, a display screen 301 (e.g., a liquid crystal display or a light-emitting diode display screen that includes touch-sensitive circuitry) displays a user interface (UI) 303 of a design editor application (e.g., an implementation of application 222) running on user device 110.

As indicated in FIG. 3, an augmented-reality sensor 306 (e.g., an implementation of a portion of input device 216) can be operated to capture an image 308 of a real-world object 300 and one or more surrounding objects such as an object 302 located alongside real-world object 300, an object 304 located partially behind real-world object 300, and/or other surrounding objects such as objects (not shown) located below, above or elsewhere in relation to the real-world object. In the example of FIG. 3, real-world object 300 is depicted as a billboard 300 mounted among surrounding buildings 302 and 304.

As shown in FIG. 3, the design editor UI 303 displays the image 308 including a representation 310 (e.g., a real-time image) of real-world object 300. Because digital (e.g., image) representations 312 and 314 of buildings 302 and 304 are also included in 308, the effect of placing design features on the real-world object can be visualized by the user, as the design features will appear in the real-world.

In the example of FIG. 3, the design features include a virtual representation 316 of a star that has been placed by a user at the top left corner of the representation 310 of billboard 300 in image 308. Image 308 may be a still image or a real-time image feed from AR sensor 306. As indicated in FIG. 3, user device 110 is in communication (e.g., via network 150) with image server 130. In some implementations, when a user places the virtual representation 316 of the star at the top left corner of the real-world object, user device 110 sends image information, describing a star at the top left corner, to image server 130.

Responsively, image server 130 provides the image information to machine-learning engine 240 (see FIG. 2). Responsively, machine-learning engine 240 identifies one or more recommended images from image database 252, and provides the recommended images to user device 110. As shown in FIG. 3, one or more of the recommended images 320 for the design of real-world object 300 can be displayed in the design editor UI 303. In the example of FIG. 3, three recommended images from image database 252 are displayed, each with at least one star at or near the top left corner, and each with differing additional content (e.g., additional stars, a crescent moon, or a cloud in the example of FIG. 3) for consideration by the user. Each of the recommended images 320 can be selectable by the user for overlay on the representation 310 of object 300 in image 308.

As shown in FIG. 3, the design editor can also provide a search tool 322 with which search terms or phrases that are directly entered by the user, such as for additional or different desired content, location, and/or positions of the content, and/or themes for images for the design of real-world object 300 can be sent to image server 130 (e.g., in addition to the image information (design information) generated by user device 110 responsive to the placement of the star at the left top corner). Search tool 322 may be used, for example, to initially define the content of the recommended images, or to further refine the content of the recommended images 320 (e.g., by including query language requiring a crescent moon or requiring a cloud-free image) in addition to the defining features indicated by the user's design choices and modifications (e.g., the location, size, shape, color, and/or other aspects of design features such as the star of FIG. 3). As described in further detail below (e.g., in connection with FIGS. 4 and 5), the active design selections, placements, and/or modifications that are made by the user can be automatically provided by user device 110 to machine-learning engine 240, to look for visually similar media. In this way, the user's design choices are included in search performed by the machine-learning engine.

As shown in FIG. 3, the design editor can also provide one or more selectable modifiers 318 for modifying one or more aspects of the theme of the recommended images. For example, modifiers 318 may be selectable to modify the season in the recommended images 320, without modifying the content. As other examples, modifiers 318 may be selectable to modify the color palette of the recommended images, the gender of people in the recommended images, the species of animal in the recommended images, the city or rural background of the recommended images, the time of day in the recommended images, or other theme aspects.

In contrast with design editors that do not have the augmented reality capabilities illustrated in FIG. 3, in which the design of the appearance of real-world object 300 can be visualized in the context of the surrounding objects 302 and 304 (e.g., on a real-time image 308 of the environment of the object 300), a designer using the design editor of FIG. 3 can determine (based on the augmented reality view provided by user device 110) that the star would look better at the top right of billboard 300, between buildings 302 and 304, than in the initial design shown in FIG. 3.

Figure 4:
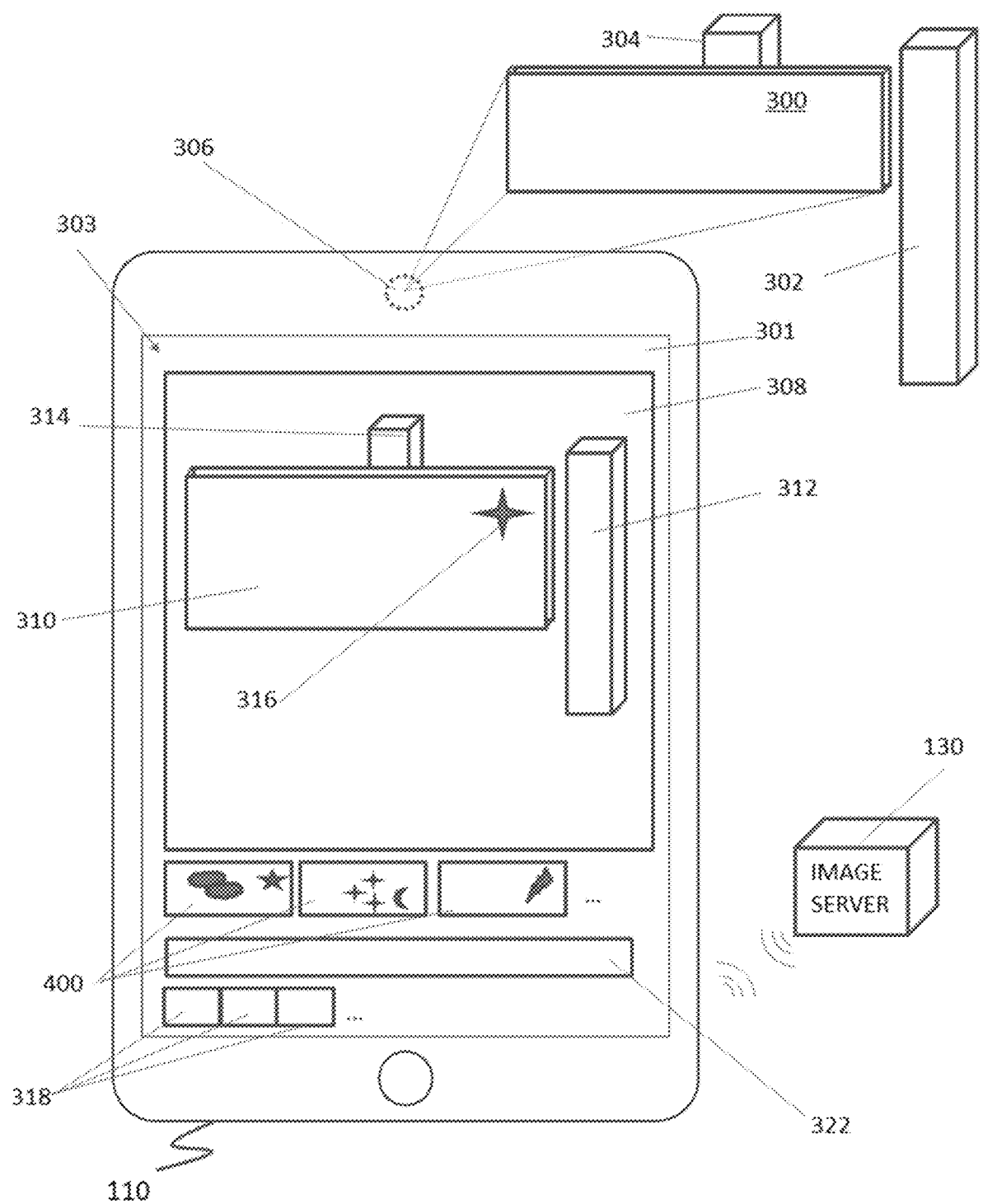
FIG. 4 illustrates the example user device of FIG. 3 following a modification of image information, according to certain aspects of the disclosure.

FIG. 4 illustrates the user device 110 following a move, by the user, of the virtual representation 316 of the star to the top right corner of the image representation 310 of the billboard. For example, using a mouse, a touchscreen, or other input device of user device 110, the user can drag virtual representation 316 of the star from the location shown in FIG. 3 to the location shown in FIG. 4. The design editor application can then provide location information describing the new location (and/or the change in location) to image server 130.

As indicated in FIG. 4, responsive to receiving the updated location information, image server 130 (e.g., using machine-learning engine 240) can identify and provide new recommended images 400, that can then be displayed in the design editor UI 303 for consideration by the user. In the example of FIG. 4, three of the new recommended images 400 from image database 252 are displayed. In this illustrative example, two of recommended images 400 include at least one star at or near the top right corner, each of these two with differing additional content (e.g., clouds, or additional stars and a crescent moon) and one including a different natural light source (e.g., a lightning bolt) at the top right corner, for consideration by the user.

Figure 5:
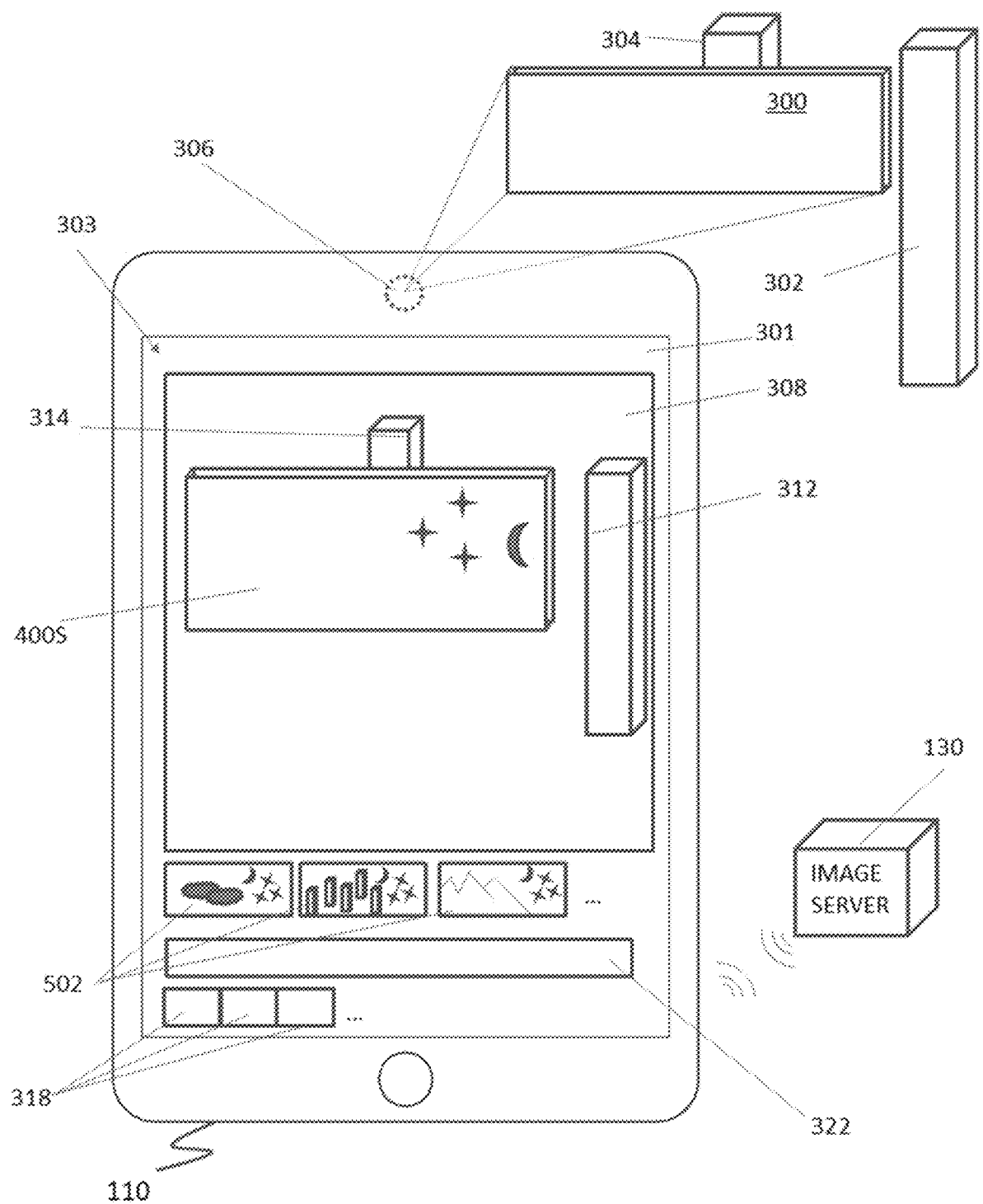
FIG. 5 illustrates the example user device of FIG. 4 following a selection of a recommended image from an image server, according to certain aspects of the disclosure.

As described above, the recommended images that are provided from image server 130 can be selected by the user for overlay on the representation 310 of real-world object 300 in image 308. FIG. 5 illustrates an example in which a selected image 400S from recommended images 400 has been overlaid on image representation 310 of real-world object 300 in image 308. In this way, the user is provided with the ability to see what selected image 400S looks like deployed on real-world object 300 in the real-world environment that includes surrounding objects 302 and 304.

FIG. 5 also shows how the selection of a particular one of recommended images 400 (e.g., selected image 400S) can also be used to better refine the set of recommended images from image server 130. For example, when selected image 400S is selected, as indicated in FIG. 5, an indication of the selection can be provided from user device 110 to image server 130. Image server 130 can then use the selected image features and/or the image metadata for that image as inputs to machine-learning engine 240, in order to retrieve similar images in image database 252 for yet another update to the set of recommended images.

In the example of FIG. 5, three new recommended images 502 are displayed in the design editor UI 303, each similar to selected image 400S (e.g., each having several stars and a crescent moon at or near the top right corner, and including differing additional content such as clouds, skyscrapers, and mountains). If desired, the user can select one of recommended images 502 to replace the previously selected image 400S as an overlay on image 308.

Figure 6:
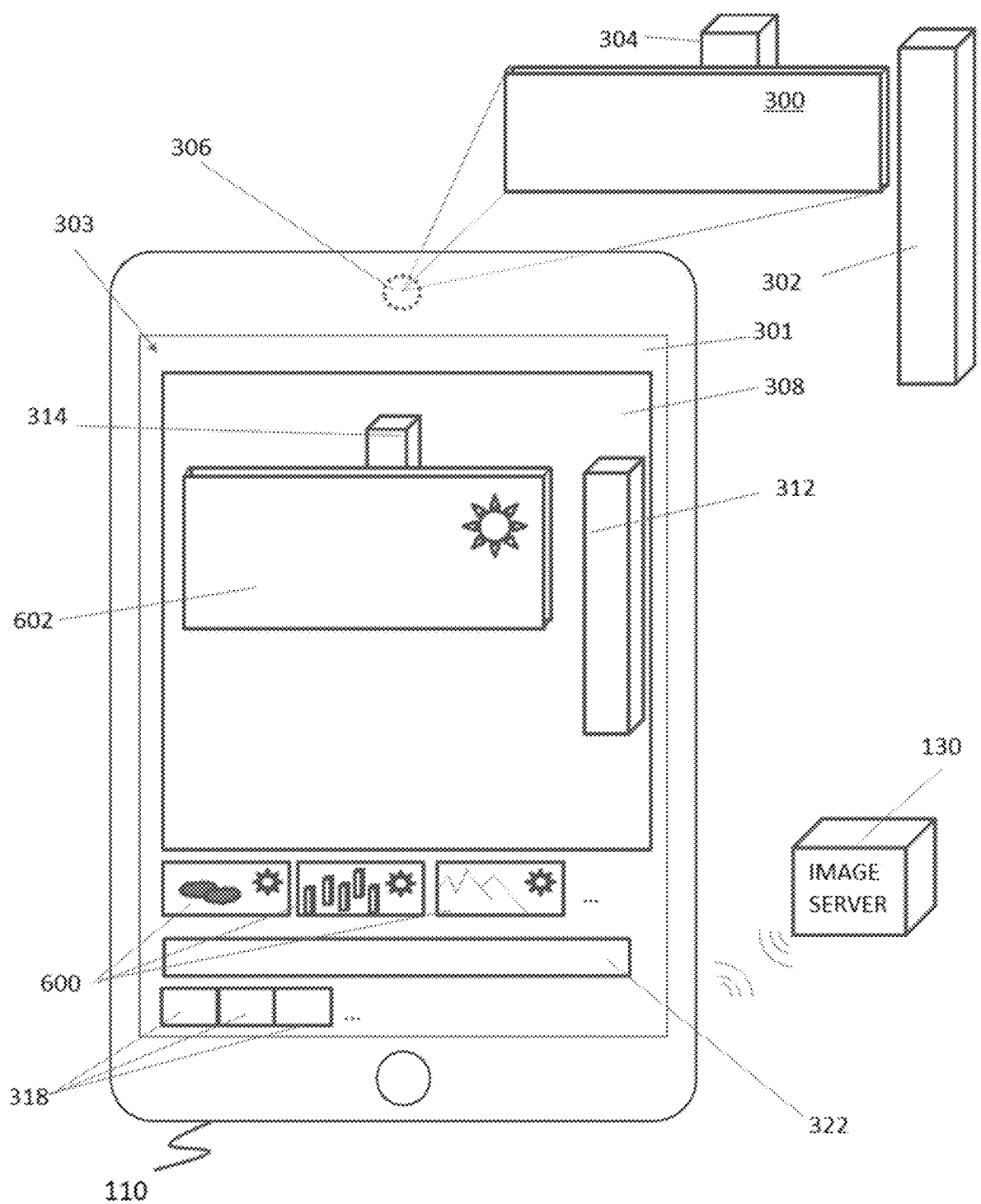
FIG. 6 illustrates the example user device of FIG. 5, following a modification of a theme of a selected image, according to certain aspects of the disclosure.

As noted above, the design editor UI 303 can also provide other tools for modifying the set of recommended images from image server 130, such as selectable modifiers 318. FIG. 6 illustrates an example in which design editor UI 303 (e.g., by selection of one of selectable modifiers 318) has been used to modify the time-of-day in the selected and recommended images from night (e.g., including stars and a crescent moon at the top right corner) to daytime (e.g., with a bright sun at the top right corner). In this example, the content of the selected and recommended images has changed, while maintaining the location information that places the natural light source at or near the top right of the image.

It should also be appreciated that, in some implementations, user device 110 can provide image 308, and/or AR information obtained using AR sensor 306 and describing characteristics of object 300, and/or surrounding objects 302 and 304 to image server 130. This additional real-world environment information can also be input to machine-learning engine 240 (e.g., having been trained using real-world environment information and selected images from prior iterations). Responsively, machine-learning engine 240 can also be used to recommend images from image server that are compatible with the real-world environment and surrounding objects.

In the examples of FIGS. 3-6, the overlay of the design features (e.g., representation 316 and/or images 400S or 602) is generated on image 308 on the display screen 301 of user device 110. However, it should also be appreciated that, in some implementations, user device 110 may be provided with, or combined with, a projector with which to project AR content directly onto the real-world object 300.

Figure 7:
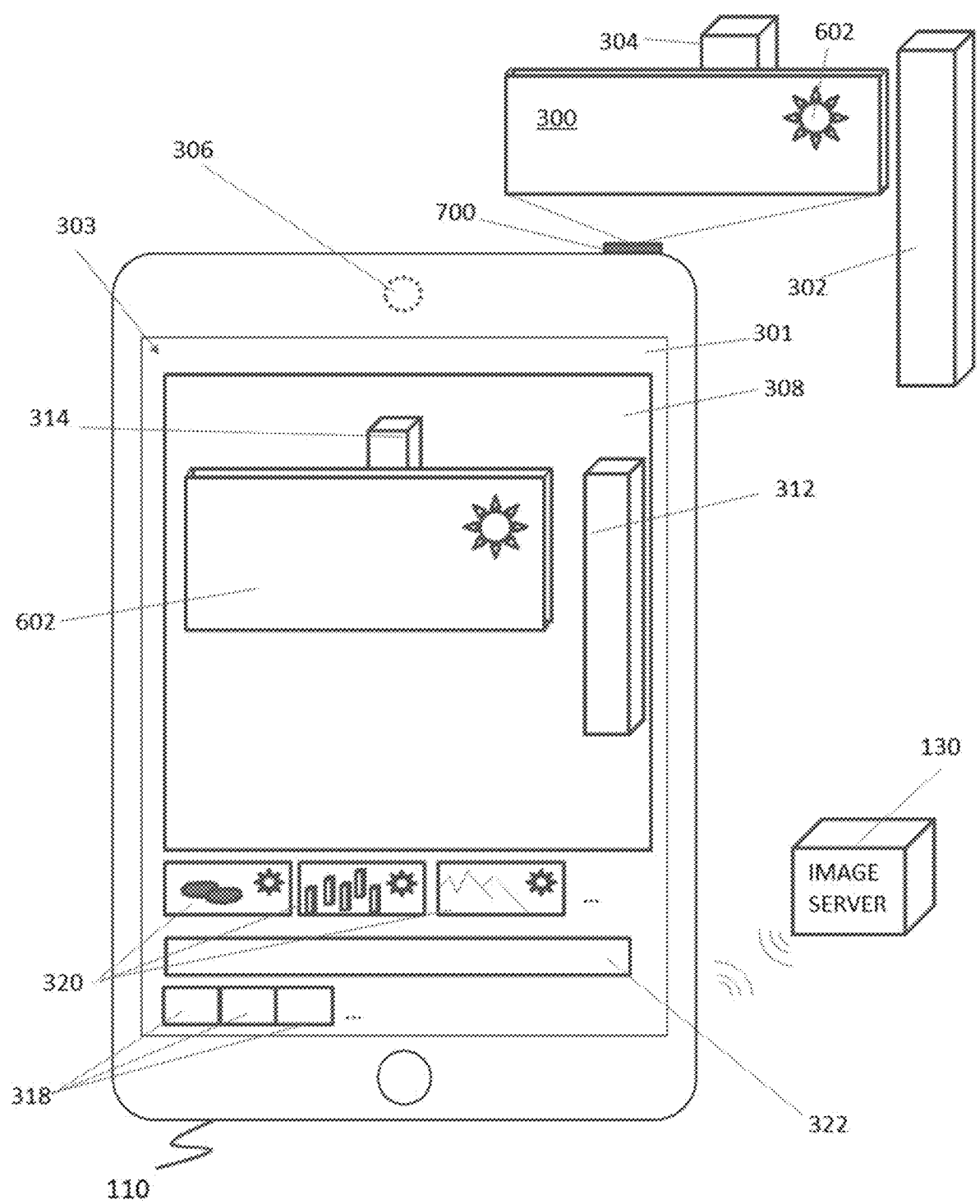
FIG. 7 illustrates an example user device having a projector for projection of a selected image onto a physical object, according to certain aspects of the disclosure.

For example, FIG. 7 illustrates an example in which a projector 700 is mounted to the housing of user device 110 and operated to project image 602 directly onto real-world object 300. This can be particularly useful for nearby objects such as (for example) for projecting an image being considered as wall art in the user's home, directly onto the wall space on which the image will ultimately hang.

It should also be appreciated that, although the examples of FIGS. 3-7 depict real-world object as a billboard, the design editor can also be used to overlay design features and/or selected images on images of other real-world objects such as busses, cars, trucks, airplanes, other vehicles, kiosks, building exteriors, interior walls of buildings, glass structures, furniture, or any other real-world object for which AR sensor 306 can obtain data and onto which an image can be printed, mounted, or otherwise physically overlaid.

In various implementations, various access points to the design editor UI 303 depicted in FIGS. 3-7 can be provided. For example, while a user is viewing an object with a camera application, a video-chat application, or other application that provides a live camera stream to display screen 301, an icon or other selectable option can be displayed with which to open the design editor application from the currently running application. In another example, which is illustrated in FIG. 8, design editor UI 303 can be operated in a non-AR mode with a selectable option to enter the AR mode depicted in FIGS. 3-7.

Figure 8:
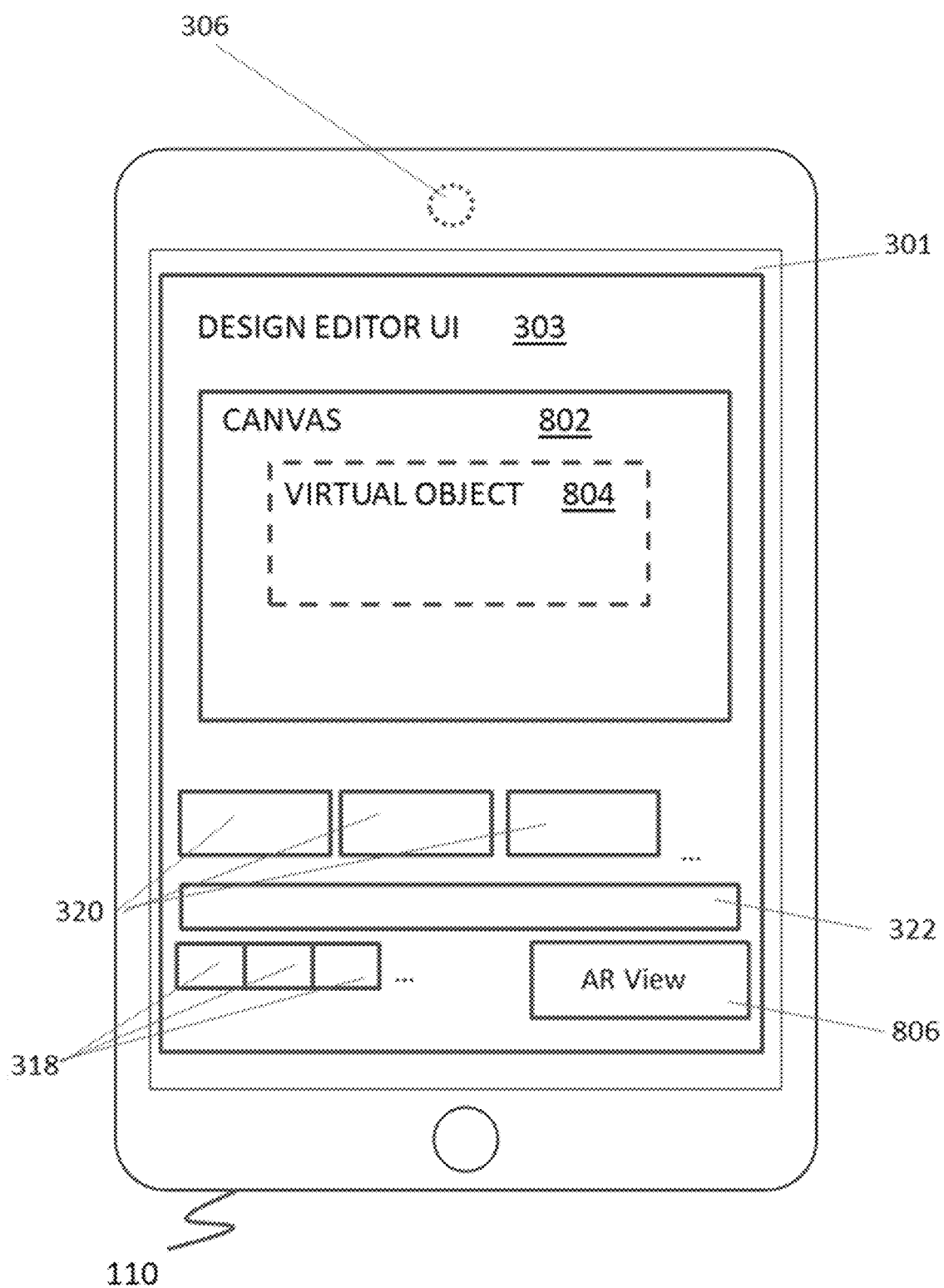
FIG. 8 illustrates an example user device operating a design editor with augmented reality image retrieval capabilities and a selectable option for activating an augmented reality display, according to certain aspects of the disclosure.

For example, as illustrated in FIG. 8, design editor UI 303 can provide a virtual canvas 802 on which one or more virtual objects 804 can be placed, and/or arranged. Design features such as the representation 316 of a star of FIG. 3, and/or one or more images from image server 130 can be overlaid on virtual object 804 (e.g., in a preliminary design stage).

As shown, in this virtual design mode, a selectable option such as a real or virtual button 806 (depicted as an "AR View" button in FIG. 3) can be provided in design editor UI 303. When it is desired to overlay a preliminary design and/or one or more images from image server 130 on a real-world object that is in range of AR sensor 306, AR View button 806 can be selected to activate AR sensor 306. Upon activation, AR sensor 306 may capture a still image or streaming images of a real-world scene, detect AR aspects of one or more objects and/or surrounding objects in the scene, and display the image(s) in UI 303 as described above in connection with, for example, FIGS. 3-7. For example, a captured still or streaming image from AR sensor 306 (or another camera communicatively coupled to user device 110) can replace virtual canvas 802 in the UI.

It should also be appreciated that, although the examples of FIGS. 3-8 illustrate AR features of a design editor associated with image server 130, AR features can be similarly provided for other applications 222 that access images in image database 252 via image server 130.

Figure 9:
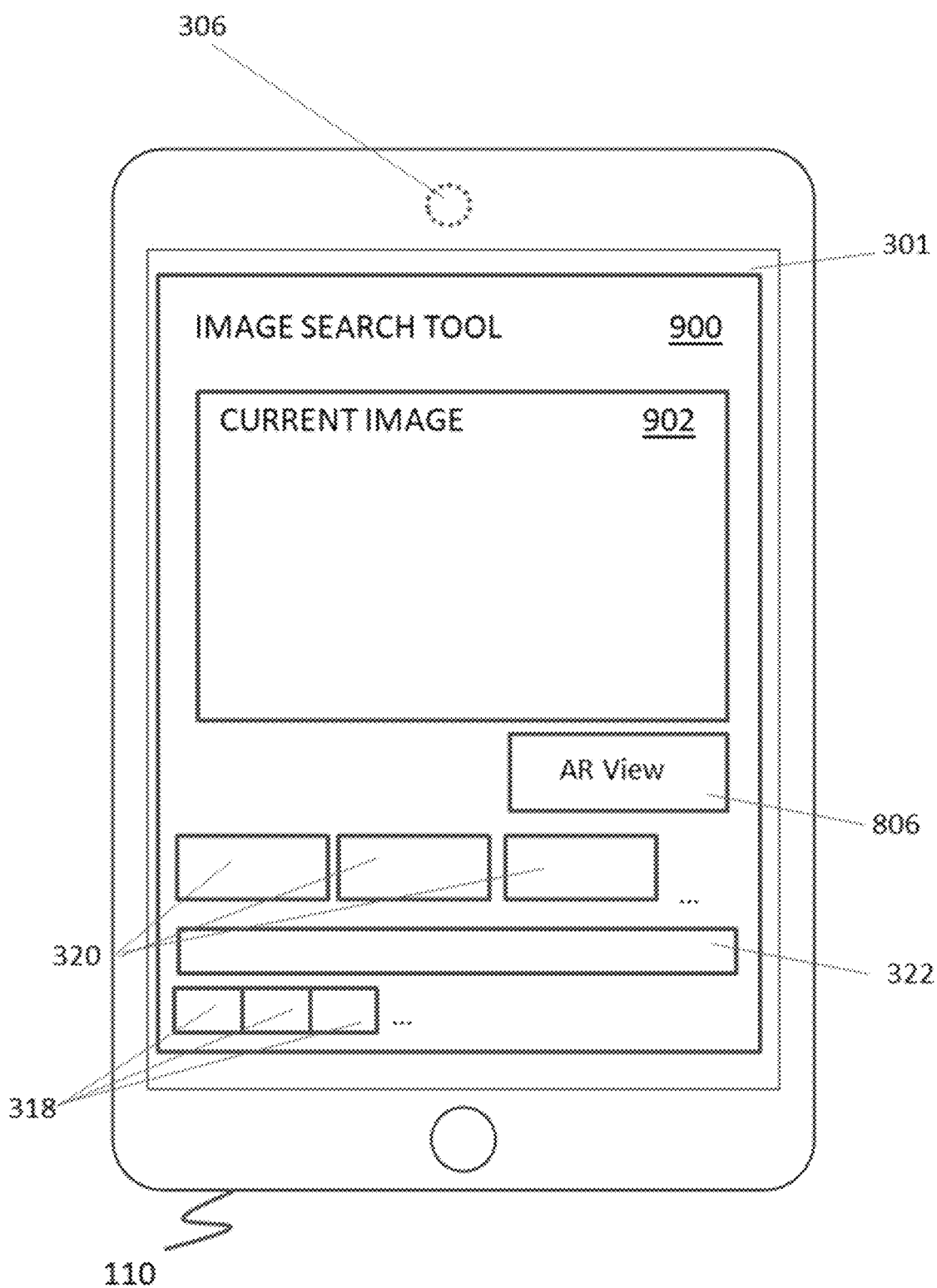
FIG. 9 illustrates an example user device operating an image search tool with augmented reality image retrieval capabilities and a selectable option for activating an augmented reality display, according to certain aspects of the disclosure.

For example, FIG. 9 illustrates an example in which an image query tool running on user device 110 is provided with AR View button 806. In the example of FIG. 9, image query tool 900 is displaying a current image 902 received from image server 130, along with several recommended images 320 (e.g., based on previously submitted image queries), search tool 322, and modifiers 318. In this mode, AR view button 806 can be selected to allow current image 902 and/or other images received from image server 130 to be overlaid on an image of a real-world object or projected onto a real-world object, as described above in connection with FIGS. 3-9, but within the image query tool. In this way, the image query tool 900 may allow the user of user device 110 to visualize a particular image in the room in which the user is located (e.g., on the wall in front of the user)

Figure 10:
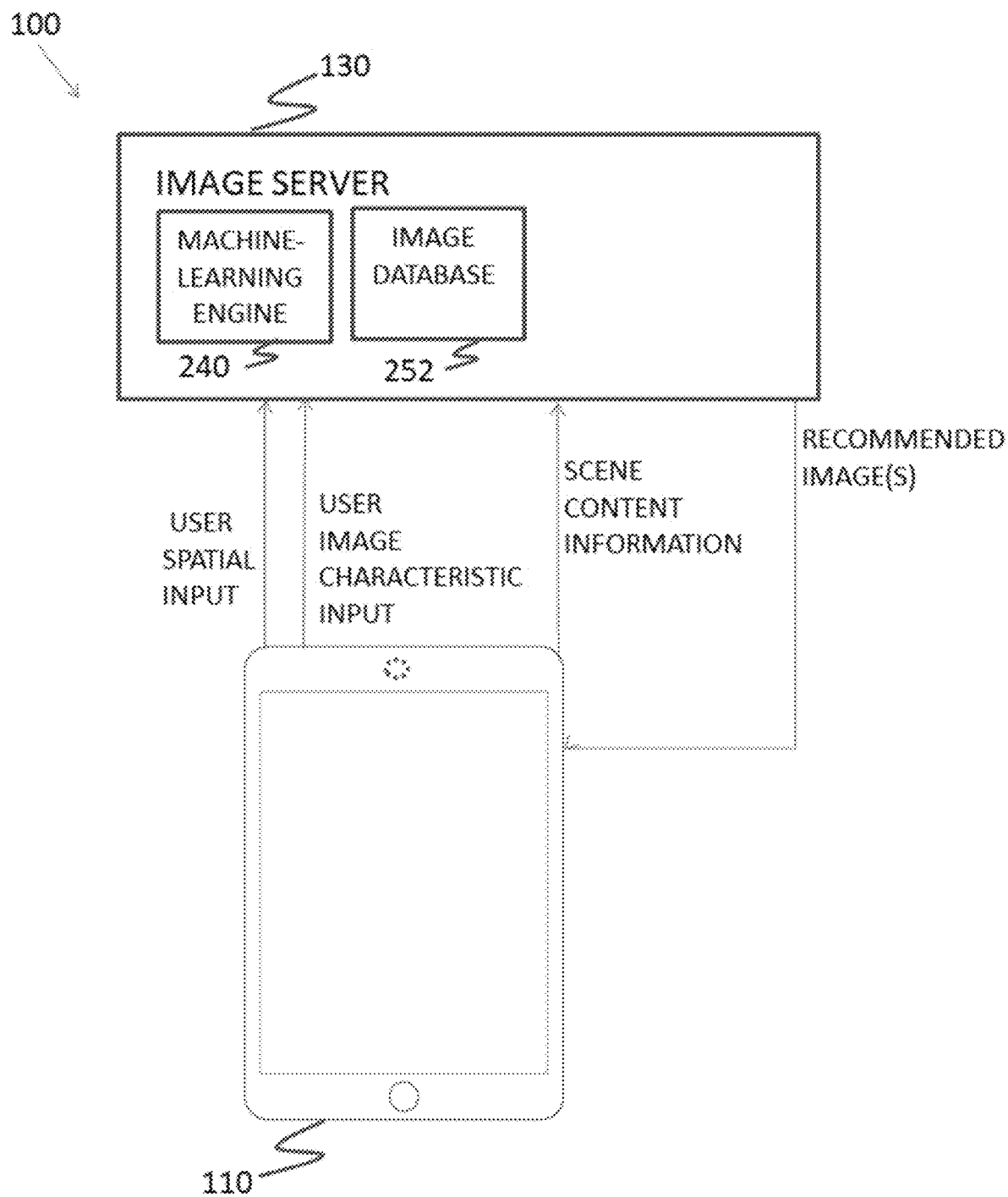
FIG. 10 illustrates a block diagram of various data exchanges during an example process for augmented reality image retrieval using the components of FIG. 2.

FIG. 10 illustrates a block diagram of system architecture 100 during an example operation for AR image retrieval from image server 130.

As shown in the example of FIG. 10, user device 110 may send image information such as user image characteristic input to image server 130. The user image characteristic input may include user-generated content such as design content (e.g., the star representation 316 of FIG. 3) and/or direct query terms specifying the content, theme, or other aspects of a desired image.

User device 110 may also send user spatial input to image server 130. The user spatial input may include the location, position, and/or orientation of the user-generated design content (e.g., relative to a real-world object in a captured image), such as the location of the representation 316 of the star in FIG. 3 or 4.

User device 110 may also send scene content information to image server 130. The scene content information may include aspects of the environment and/or surrounding objects of the real-world object. The scene content information may be generated automatically by user device 110 and/or input by the user. For example, the scene content information may include information indicating the existence, size, shape, location, color, and/or other aspects of surrounding objects such as surrounding objects 302 and 304 of FIG. 3 (e.g., as obtained using AR sensor 306).

Image server 130 may provide the user image characteristic input, the user spatial input, and/or the scene content information to machine-learning engine 240. Based on the user image characteristic input, the user spatial input, and/or the scene content information, machine-learning engine 240 identifies one or more recommended images from image database 252 and provides one or more of the recommended images to user device 110 (e.g., for display in design editor UI 303 and/or image query tool 900).

Figure 11:
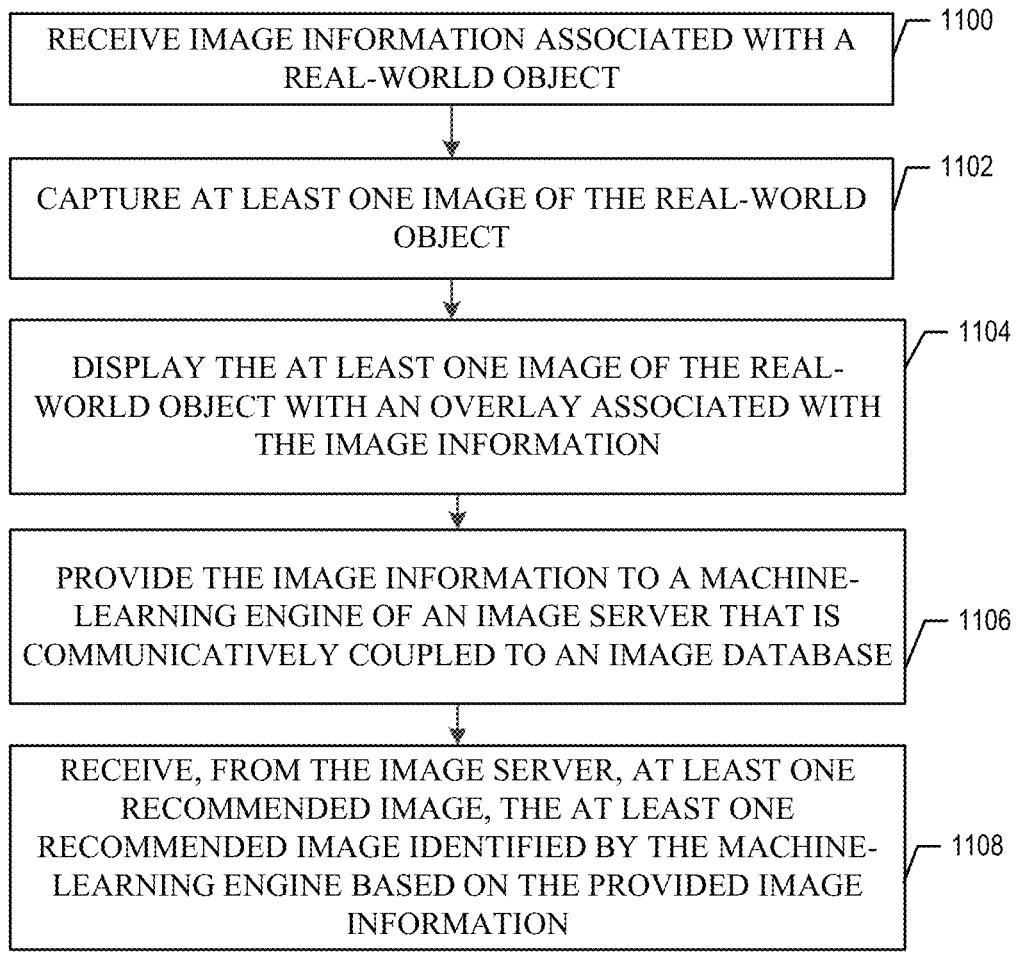
FIG. 11 illustrates an example process for operation of a design editor having augmented reality image retrieval capabilities, according to certain aspects of the disclosure.

FIG. 11 illustrates a flow diagram of an example process for AR image retrieval, in accordance with one or more implementations. For explanatory purposes, the process of FIG. 11 is primarily described herein with reference to one or more devices of FIGS. 1 and 2 (particularly with reference to user device 110 and image server 130), which may be executed by one or more processors of the user device 110 and/or image server 130 of FIGS. 1 and 2. However, the process of FIG. 11 is not limited to the user device 110, and one or more blocks (or operations) of the process may be performed by one or more other components of other suitable devices. Further for explanatory purposes, the blocks of the process of FIG. 11 are described herein as occurring in series, or linearly. However, multiple blocks of the process of FIG. 11 may occur in parallel. In addition, the blocks of the process of FIG. 11 need not be performed in the order shown and/or one or more blocks of the process of FIG. 11 need not be performed and/or can be replaced by other operations.

At block 1100, image information associated with a real-world object is received (e.g., by user device 110 based on user input to input device 216). For example, as described above in connection with FIG. 3, image information such as design content including a star at the upper left corner of a real-world object may be received from the user.

At block 1102, at least one image (e.g., image 308) of the real-world object is captured. The image can be captured by camera of an AR sensor of the user device itself, or captured by another camera then provided to the user device. Additional information for identifying features (e.g., the presence, size, shape, location, distance, orientation, etc.) of the real-world object may also be obtained using the AR sensor.

At block 1104, the at least one image of the real-world object is displayed with an overlay (e.g., representation 316 of the star) associated with the image information. The AR information and/or user input may be used to position the overlay on the representation 310 of the real-world object.

At block 1106, the image information is provided to a machine-learning engine such as machine-learning engine 240 of an image server such as image server 130 that is communicatively coupled to an image database such as image database 252.

At block 1108, the user device 110 receives, from the image server 130, at least one recommended image (e.g., recommended images 320 of FIG. 3), the at least one recommended image identified by the machine-learning engine based on the provided image information. As described above in connection with, for example, FIG. 3, the user device 110 may also display the at least one recommended image 320 along with the at least one image 308 of the real-world object 300 with the overlay 316. FIG. 3 above also shows how the at least one image 308 of the real-world object 300 includes a representation 310 of the real-world object and representations (e.g., representations 312 and 314) of one or more surrounding real-world objects (e.g., objects 302 and 304).

As indicated in FIG. 5 above, user device 110 may receive a selection of the at least one recommended image 320, remove the overlay 316 associated with the image information, and overlay the selected image 400S on the representation 310 of the real-world object 300. User device 110 may also provide an indication of the selection to the machine-learning engine 240 of the image server 130, and receive one or more additional recommended images 502 from the image server 130, responsive to providing the indication of the selection.

In some scenarios, user device 110 may also detect (e.g., using AR sensor 306) one or more characteristics of the one or more surrounding real-world objects 302 and 304. User device 110 may provide the one or more characteristics, with the image information, to the machine-learning engine 240 of the image server 130, and receive one or more additional recommended images from the image server, responsive to providing the one or more characteristics.

In various examples, the image information received at block 1100 may include design information for modification of the appearance of the real-world object 300, or a previously obtained image from the image server 130. The design information may include user-generated content (e.g., a star or any other desired content) to be overlaid on the real-world object. The design information may also include a location on the real-world object (e.g., a top left corner as in FIG. 3, a top right corner as in FIG. 4, and/or any other suitable location on the real-world object) for the user-generated content to be overlaid.

As described above in connection with, for example, FIG. 4, user device 110 may receive a modification of the overlay 316 associated with the image information, provide, to the machine-learning engine of the image server, modified image information associated with the modification of the overlay, and receive one or more additional recommended images 400 from the image server, responsive to providing the modified image information. The modification may include a modification of the user-generated content. For example, the modification of the user-generated content may include a replacement of the user-generated content with different user-generated content (e.g., a replacement of a star with different desired content). As another example, the modification of the user-generated content may include a modification of a theme for the user-generated content (e.g., a change from night to day, from summer to winter, from a current color palette to another color palette, etc.), a size of the user-generated content, an orientation of the user-generated content, and/or another modification to the user-generated content. In some examples, (e.g., as in the example of FIG. 4 in which the star is moved from the left to the right side of the representation of the real-world object), the modification includes a modification of the location of the user-generated content.

Figure 12:
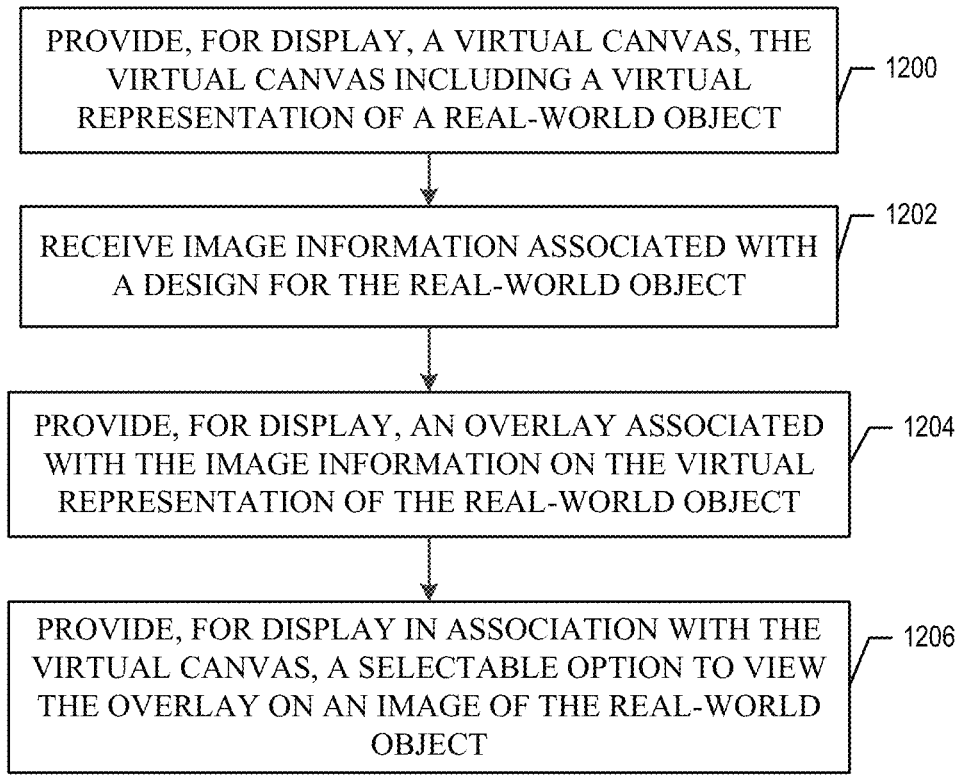
FIG. 12 illustrates an example process for operation of a design editor with augmented reality image retrieval capabilities and a selectable option for activating an augmented reality display, according to certain aspects of the disclosure.

FIG. 12 illustrates a flow diagram of an example process for providing a design editor user interface with virtual and augmented reality editing capabilities, in accordance with one or more implementations. For explanatory purposes, the process of FIG. 12 is primarily described herein with reference to one or more devices of FIGS. 1 and 2 (particularly with reference to user device 110 and image server 130), which may be executed by one or more processors of the user device 110 and/or image server 130 of FIGS. 1 and 2. However, the process of FIG. 12 is not limited to the user device 110, and one or more blocks (or operations) of the process may be performed by one or more other components of other suitable devices. Further for explanatory purposes, the blocks of the process of FIG. 12 are described herein as occurring in series, or linearly. However, multiple blocks of the process of FIG. 12 may occur in parallel. In addition, the blocks of the process of FIG. 12 need not be performed in the order shown and/or one or more blocks of the process of FIG. 12 need not be performed and/or can be replaced by other operations.

At block 1200, a portable computer such as user device 110 provides, for display, a virtual canvas (e.g., virtual canvas 802 of FIG. 8), the virtual canvas including a virtual representation (e.g., virtual object 804) of a real-world object (e.g., real-world object 300).

At block 1202, user device 110 receives image information associated with a design for the real-world object. For example, the image information may include design content at a particular location or image query terms.

At block 1204, user device 110 provides, for display, an overlay associated with the image information on the virtual representation of the real-world object. For example, the overlay may be the representation 316 of a star of FIG. 3, for overlay on virtual object 804. Providing the image for display may include providing the image 308 for replacement of the virtual canvas 802 on display screen 301 of the electronic device.

At block 1206, user device 110 provides, for display in association with the virtual canvas 802, a selectable option (e.g., AR View option 806) to view the overlay on an image (e.g., image 308) of the real-world object 300. Once the selectable option (e.g., AR View option 806) is displayed, the user device 110 may receive a selection of the selectable option (e.g., via user interaction with a touch-sensitive display). The user device may obtain an image (e.g., image 308) of the real-world object responsive to the selection, identify (e.g., using AR information from AR sensor 306) a representation 310 of the real-world object in the image, provide the image for display (e.g., by display screen 301), and provide the overlay 316 associated with the image information on the identified representation 310 of the real-world object in the image.

The image information that is received at block 1202 may also be provided to a machine-learning engine 240 of an image server 130 that is communicatively coupled to an image database 252. User device 110 may receive, from the image server, at least one recommended image (see, e.g., images 320, 400, 502, 600), the at least one recommended image identified by the machine-learning engine 240 based on the provided image information.

Figure 13:
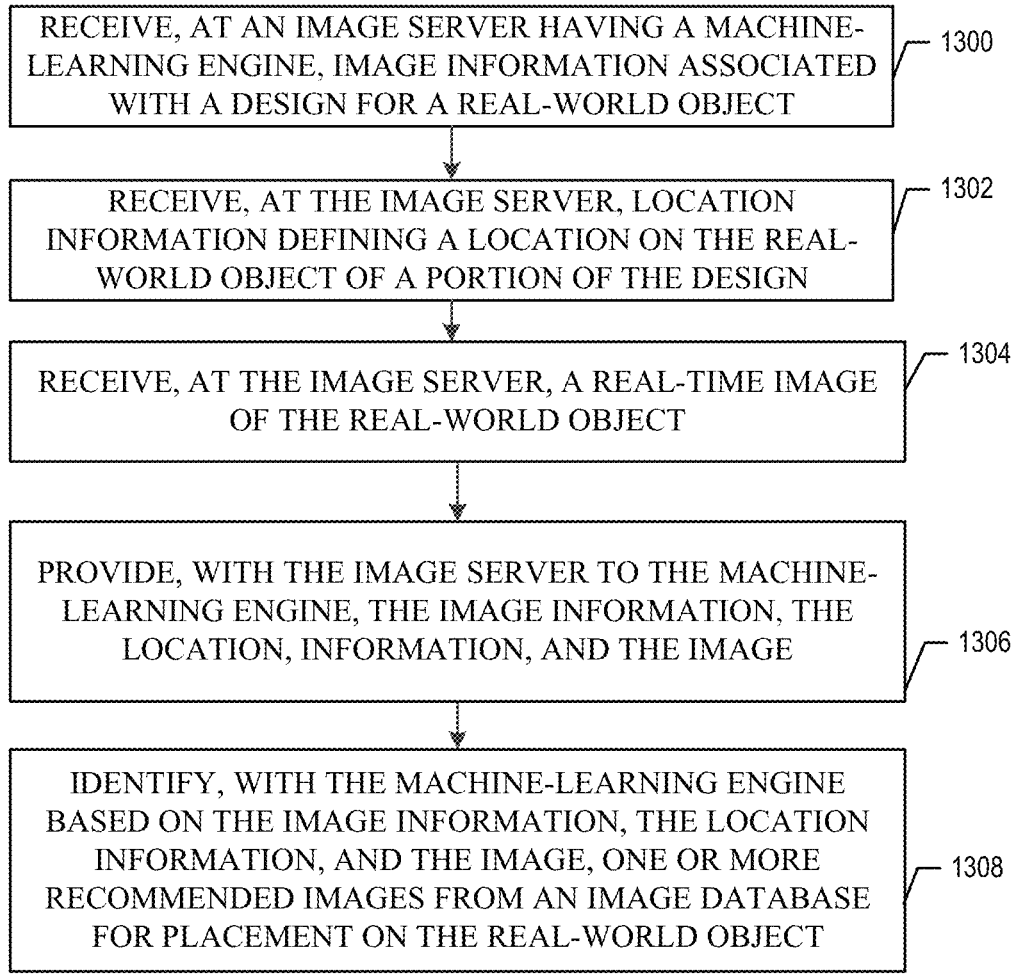
FIG. 13 illustrates an example process for operating an image server in an augmented reality image retrieval system, according to certain aspects of the disclosure.

FIG. 13 illustrates a flow diagram of an example process for operating an image server in an augmented reality image retrieval system, in accordance with one or more implementations. For explanatory purposes, the process of FIG. 13 is primarily described herein with reference to one or more devices of FIGS. 1 and 2 (particularly with reference to user device 110 and image server 130), which may be executed by one or more processors of the user device 110 and/or image server 130 of FIGS. 1 and 2. However, the process of FIG. 13 is not limited to the user device 110, and one or more blocks (or operations) of the process may be performed by one or more other components of other suitable devices. Further for explanatory purposes, the blocks of the process of FIG. 13 are described herein as occurring in series, or linearly. However, multiple blocks of the process of FIG. 13 may occur in parallel. In addition, the blocks of the process of FIG. 13 need not be performed in the order shown and/or one or more blocks of the process of FIG. 13 need not be performed and/or can be replaced by other operations.

At block 1300, an image server such as one of image servers 130 having a machine-learning engine such as machine-learning engine 240, receives image information associated with a design for a real-world object (e.g., real-world object 300). For example, user device 110 may provide image information indicating that the user has placed a star or other content for the design on a representation 316 of a real-world object 300.

At block 1302, the image server receives location information defining a location on the real-world object of a portion of the design. For example, user device 110 may provide location information that indicates that the star is located in the top left corner of the representation 310 of the real-world object 300.

At block 1304, the image server may receive a real-time image (e.g., image 308) of the real-world object and/or AR features (e.g., the location, size, orientation, position, shape, etc. as determined using an AR sensor) of the real-world object.

At block 1306, the image server 130 provides, to the machine-learning engine 240, the image information, the location, information, and the image (and/or the AR information).

At block 1308, the machine-learning engine 240 identifies, based on the image information, the location information, and the image (and/or the AR information), one or more recommended images (see, e.g., images 320, 400, 502, 600) from an image database, for placement on the real-world object. The one or more recommended images may then be provided by the image server to the user device for display in a design editor UI 303 or other application running on the user device.

Figure 14:
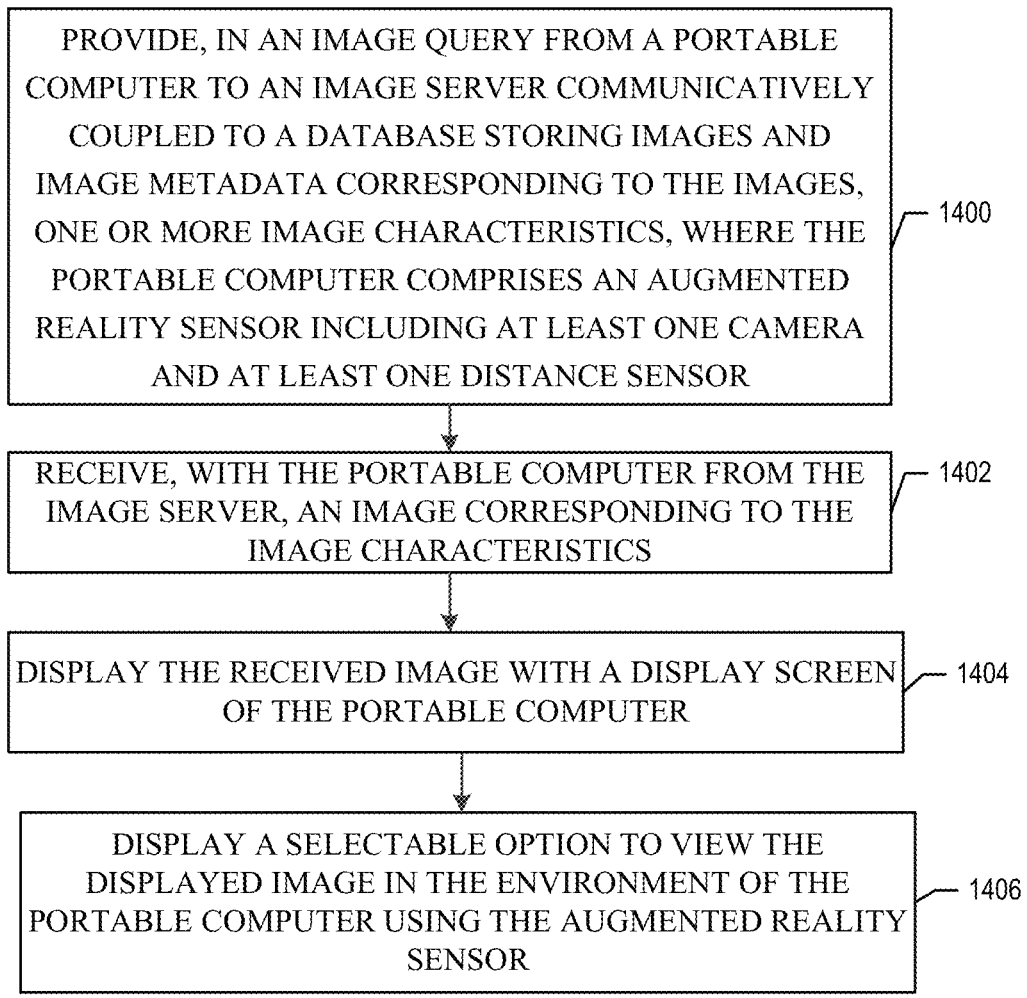
FIG. 14 illustrates an example process for operation of an image query tool having augmented reality image retrieval capabilities, according to certain aspects of the disclosure.

FIG. 14 illustrates a flow diagram of an example process for AR image retrieval in an image query tool, in accordance with one or more implementations. For explanatory purposes, the process of FIG. 14 is primarily described herein with reference to one or more devices of FIGS. 1 and 2 (particularly with reference to user device 110 and image server 130), which may be executed by one or more processors of the user device 110 and/or image server 130 of FIGS. 1 and 2. However, the process of FIG. 14 is not limited to the user device 110, and one or more blocks (or operations) of the process may be performed by one or more other components of other suitable devices. Further for explanatory purposes, the blocks of the process of FIG. 14 are described herein as occurring in series, or linearly. However, multiple blocks of the process of FIG. 11 may occur in parallel. In addition, the blocks of the process of FIG. 14 need not be performed in the order shown and/or one or more blocks of the process of FIG. 14 need not be performed and/or can be replaced by other operations.

At block 1400, one or more image characteristics are provided in an image query from a portable computer such as user device 110 to an image server such as image server 130 communicatively coupled to a database such as database 252 storing images and image metadata corresponding to the images. The portable computer includes or is communicatively coupled to an augmented reality sensor such as AR sensor 306, including at least one camera and at least one distance sensor as described herein. The image characteristics may include query terms for the content, theme, and/or other aspects of a desired image.

At block 1402, the portable computer receives, from the image server, an image (e.g., current image 902 of FIG. 9) corresponding to the image characteristics.

At block 1404, the portable computer displays the received image (e.g., with a display screen 301 of the portable computer).

At block 1406, a selectable option such as AR View button 806 is displayed (e.g., as illustrated in FIG. 9) to view the displayed image in the environment of the portable computer using the augmented reality sensor. If the portable computer receives a selection of the selectable option, the portable computer may capture at least one image of the environment using the at least one camera responsive to the selection, determine, responsive to the selection, a distance to a real-world object in the environment using the at least one distance sensor, display the at least one image of the environment on the display screen, and overlay the image received from the image server on the at least one image of the environment based on the distance to the real-world object.

Hardware Overview

Figure 15:
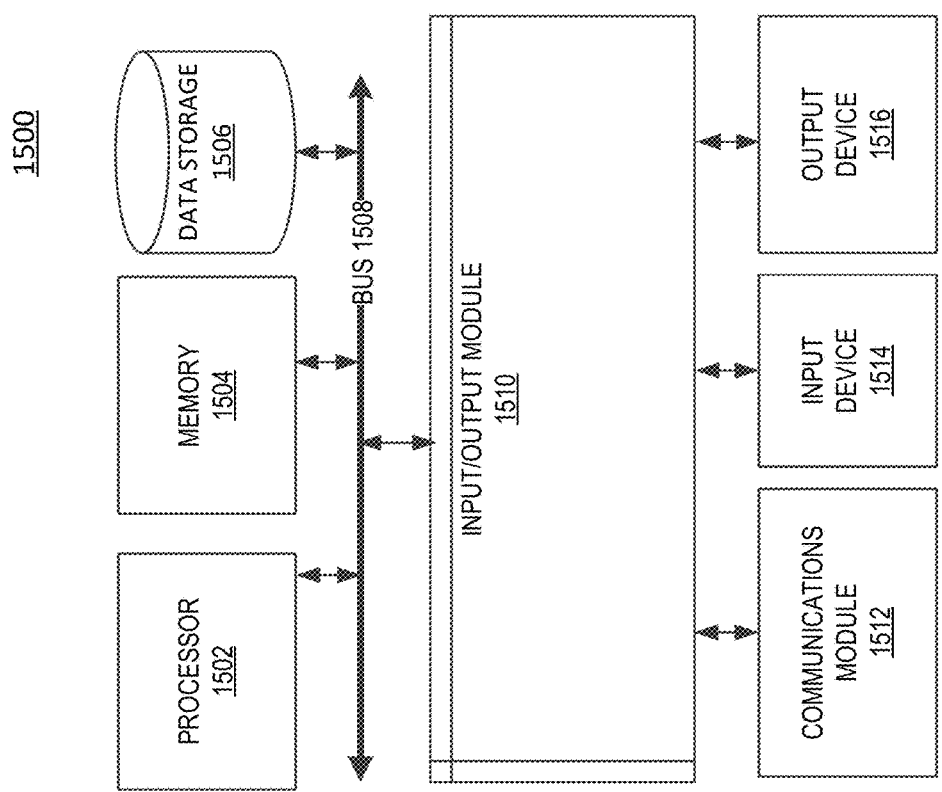
FIG. 15 is a block diagram illustrating an example computer system with which the user device and/or image server of FIG. 2 can be implemented.

FIG. 15 is a block diagram illustrating an exemplary computer system 1500 with which the user device 110 and/or image server 130 of FIG. 1 can be implemented. In certain aspects, the computer system 1500 may be implemented using hardware or a combination of software and hardware, either in a dedicated server, or integrated into another entity, or distributed across multiple entities.

Computer system 1500 includes a bus 1508 or other communication mechanism for communicating information, and a processor 1502 (e.g., an implementation of processor 212 or 236) coupled with bus 1508 for processing information. By way of example, the computer system 1500 may be implemented with one or more processors 1502. Processor 1502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1500 can include, in addition to hardware, code that creates an execution environment for the computer program in question, e.g., code that constitutes processor firmware, a protocol stack, a database management system, an operating system, or a combination of one or more of them stored in an included memory 1504 (e.g., memory 220 or 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1508 for storing information and instructions to be executed by processor 1502. The processor 1502 and the memory 1504 can be supplemented by, or incorporated in, special purpose logic circuitry.

The instructions may be stored in the memory 1504 and implemented in one or more computer program products, i.e., one or more modules of computer program instructions encoded on a computer readable medium for execution by, or to control the operation of, the computer system 1500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1504 may also be used for storing temporary variable or other intermediate information during execution of instructions to be executed by processor 1502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1500 further includes a data storage device 1506 such as a magnetic disk or optical disk, coupled to bus 1508 for storing information and instructions. Computer system 1500 may be coupled via input/output module 1510 to various devices. The input/output module 1510 can be any input/output module. Exemplary input/output modules 1510 include data ports such as USB ports. The input/output module 1510 is configured to connect to a communications module 1512. Exemplary communications modules 1512 (e.g., communications modules 218 and 238) include networking interface cards, such as Ethernet cards and modems. In certain aspects, the input/output module 1510 is configured to connect to a plurality of devices, such as an input device 1514 (e.g., input device 216) and/or an output device 1516 (e.g., output device 214). Exemplary input devices 1514 include a keyboard and a pointing device (e.g., a mouse or a trackball), by which a user can provide input to the computer system 1500. Other kinds of input devices 1514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1516 include display devices, such as a LCD (liquid crystal display) monitor, for displaying information to the user.

According to one aspect of the present disclosure, user device 110 and/or image servers 130 can be implemented using a computer system 1500 in response to processor 1502 executing one or more sequences of one or more instructions contained in memory 1504. Such instructions may be read into memory 1504 from another machine-readable medium, such as data storage device 1506. Execution of the sequences of instructions contained in main memory 1504 causes processor 1502 to perform the process steps described herein. One or more processors in a multi-processing arrangement may also be employed to execute the sequences of instructions contained in memory 1504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1500 can include clients and servers. A client and server are generally remote from each other and typically interact through a communication network. The relationship of client and server arises by virtue of computer programs running on the respective computers and having a client-server relationship to each other. Computer system 1500 can be, for example, and without limitation, a desktop computer, laptop computer, or tablet computer. Computer system 1500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1502 for execution. Such a medium may take many forms, including, but not limited to, non-volatile media, volatile media, and transmission media. Non-volatile media include, for example, optical or magnetic disks, such as data storage device 1506. Volatile media include dynamic memory, such as memory 1504. Transmission media include coaxial cables, copper wire, and fiber optics, including the wires that comprise bus 1508. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving, with an electronic device, image information associated with a design for a real-world object;
   capturing, with the electronic device, at least one image of the real-world object;
   displaying, with the electronic device, the at least one image of the real-world object with an overlay associated with the image information;
   providing the image information from the electronic device to a machine-learning engine of an image server that is communicatively coupled to an image database;
   receiving, at the electronic device from the image server, at least one recommended image, the at least one recommended image identified by the machine-learning engine based on the image information; and
   displaying the at least one recommended image along with the at least one image of the real-world object with the overlay, wherein the image information comprises a perspective view of the real-world object and a surrounding object, and the machine-learning engine identifies the recommended image in the design for the real-world object based on a spatial input indicative of a relation between the real-world object and the surrounding object.

2. The computer-implemented method of claim 1, wherein the image information comprises a previously obtained image from the image server.

3. The computer-implemented method of claim 1, wherein the at least one image of the real-world object includes a representation of the real-world object and representations of one or more surrounding real-world objects.

4. The computer-implemented method of claim 3, further comprising:
receiving a selection of the at least one recommended image;
removing the overlay associated with the image information; and
overlaying the at least one recommended image on the representation of the real-world object.

5. The computer-implemented method of claim 4, further comprising:
providing an indication of the selection to the machine-learning engine of the image server; and
receiving one or more additional recommended images from the image server, responsive to providing the indication of the selection.

6. The computer-implemented method of claim 3, further comprising:
detecting, with the electronic device, one or more characteristics of the one or more surrounding real-world objects;
providing the one or more characteristics, with the image information, to the machine-learning engine of the image server; and
receiving one or more additional recommended images from the image server, responsive to providing the one or more characteristics.

7. The computer-implemented method of claim 1, wherein the image information comprises design information for modification of an appearance of the real-world object.

8. The computer-implemented method of claim 7, wherein the design information includes user-generated content to be overlaid on the real-world object.

9. The computer-implemented method of claim 8, wherein the design information further includes a location on the real-world object for the user-generated content to be overlaid.

10. The computer-implemented method of claim 9, further comprising:
receiving, with the electronic device, a modification of the overlay associated with the image information;
providing, from the electronic device to the machine-learning engine of the image server, modified image information associated with the modification of the overlay; and
receiving one or more additional recommended images from the image server, responsive to providing the modified image information.

11. The computer-implemented method of claim 10, wherein the modification includes a modification of the user-generated content.

12. The computer-implemented method of claim 11, wherein the modification of the user-generated content includes a modification of a theme for the user-generated content, or a replacement of the user-generated content with different user-generated content.

13. The computer-implemented method of claim 10, wherein the modification includes a modification of the location of the user-generated content.

14. A computer-implemented method, comprising:
providing, for display by a device, a virtual canvas, the virtual canvas comprising a virtual representation for a design of a real-world object;
receiving, with the device, image information associated with a design for the real-world object;
providing, for display by the device, an overlay associated with the image information on the virtual representation of the real-world object;
providing, for display in association with the virtual canvas, a selectable option to view the overlay on an image of the real-world object; and
displaying the selectable option along with at least one image of the real-world object with the overlay, wherein the virtual representation comprises a perspective view of the real-world object and a surrounding object, and the selectable option comprises a recommended image in the design for the real-world object based on a spatial input indicative of a relation between the real-world object and the surrounding object.

15. The computer-implemented method of claim 14, further comprising:
receiving a selection of the selectable option with the device;
obtaining an image of the real-world object responsive to the selection;
identifying a representation of the real-world object in the image with the device;
providing the image for display by the device; and
providing the overlay associated with the image information, on the representation of the real-world object in the image.

16. The computer-implemented method of claim 15, further comprising:
providing the image information from the device to a machine-learning engine of an image server that is communicatively coupled to an image database; and
receiving, at the device from the image server, at least one recommended image, the at least one recommended image identified by the machine-learning engine based on the provided image information.

17. The computer-implemented method of claim 15, wherein providing the image for display by the device comprises providing the image for replacement of the virtual canvas on a display of the device.

18. A computer-implemented method, comprising:
providing, in an image query, from a portable computer to an image server that is communicatively coupled to a database storing images and image metadata corresponding to the images, one or more image characteristics associated with a design for a real-world object, wherein the portable computer comprises an augmented reality sensor including at least one camera and at least one distance sensor;
receiving, with the portable computer from the image server, an image corresponding to the image characteristics;
displaying the image with a display screen of the portable computer; and
displaying a selectable option to view the image in an environment of the portable computer using the augmented reality sensor, wherein a virtual representation in the augmented reality sensor comprises a perspective view of the real-world object and a surrounding object, and the selectable option comprises a recommended image in the design for the real-world object based on a spatial input indicative of a relation between the real-world object and the surrounding object.

19. The computer-implemented method of claim 18, further comprising:
- receiving, with the portable computer, a selection of the selectable option;
- capturing at least one image of the environment using the at least one camera responsive to the selection;
- determining, responsive to the selection, a distance to a real-world object in the environment using the at least one distance sensor;
- displaying the at least one image of the environment on the display screen; and
- overlaying the image received from the image server on the at least one image of the environment based on the distance to the real-world object.

* * * * *